US010708186B2

United States Patent
Kurabayashi

(10) Patent No.: US 10,708,186 B2
(45) Date of Patent: Jul. 7, 2020

(54) INFORMATION PROCESSING SYSTEM, SERVER, AND PROGRAM, AND TERMINAL AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 158 days.

(21) Appl. No.: 15/820,330

(22) Filed: Nov. 21, 2017

(65) Prior Publication Data
US 2018/0077063 A1    Mar. 15, 2018

Related U.S. Application Data

(63) Continuation of application No. PCT/JP2016/064611, filed on May 17, 2016.

(30) Foreign Application Priority Data

May 22, 2015    (JP) .................... 2015-104218

(51) Int. Cl.
*H04L 12/801*    (2013.01)
*A63F 13/358*    (2014.01)
(Continued)

(52) U.S. Cl.
CPC .............. *H04L 47/12* (2013.01); *A63F 13/30* (2014.09); *A63F 13/352* (2014.09);
(Continued)

(58) Field of Classification Search
CPC ...... H04L 47/12; H04L 49/3045; A63F 13/30; A63F 13/352; A63F 13/358; A63F 13/44; A63F 13/52; A63F 13/53; A63F 13/537
See application file for complete search history.

(56) References Cited

U.S. PATENT DOCUMENTS 6,884,169 B2 *   4/2005   Tsuchida ............... A63F 13/10
                                                              463/31
8,032,799 B2 *  10/2011   Hamilton, II ....... G06F 11/0769
                                                              714/57
(Continued)

FOREIGN PATENT DOCUMENTS

JP    2000-115095 A    4/2000
JP    2001-307285 A   11/2001
(Continued)

OTHER PUBLICATIONS

International Search Report issued in Application No. PCT/JP2016/064611, dated Aug. 16, 2016 (1 page).
(Continued)

*Primary Examiner* — Philip J Chea
*Assistant Examiner* — Robert B McAdams
(74) *Attorney, Agent, or Firm* — Osha Liang LLP

(57) ABSTRACT

At a server, a load monitoring unit monitors whether or not a predetermined condition regarding processing of requests is satisfied. In the case where the predetermined condition is not satisfied, a wait-time calculating unit calculates a wait time as a time parameter for controlling the speed of time flow at a player terminal side. A request executing unit executes requests in the order of arrival and generates responses. A response sending control unit executes control to send responses to the player terminals that have sent the corresponding requests and to also send to the player terminals information representing the wait time in the case where the wait time has been calculated.

14 Claims, 10 Drawing Sheets

(51) Int. Cl.
    *A63F 13/53*     (2014.01)
    *A63F 13/30*     (2014.01)
    *A63F 13/44*     (2014.01)
    *A63F 13/537*     (2014.01)
    *H04L 12/935*     (2013.01)
    *A63F 13/352*     (2014.01)
    *A63F 13/52*     (2014.01)

(52) U.S. Cl.
    CPC ............ *A63F 13/358* (2014.09); *A63F 13/44* (2014.09); *A63F 13/52* (2014.09); *A63F 13/53* (2014.09); *A63F 13/537* (2014.09); *H04L 49/3045* (2013.01)

(56) References Cited

U.S. PATENT DOCUMENTS

| | | | | |
|---|---|---|---|---|
| 8,750,213 | B2* | 6/2014 | Jang | H04W 76/18 |
| | | | | 370/328 |
| 9,009,253 | B2* | 4/2015 | Chandrasekhar | H04L 12/66 |
| | | | | 709/217 |
| 2005/0267980 | A1* | 12/2005 | Warren | H04L 51/30 |
| | | | | 709/232 |
| 2014/0244322 | A1* | 8/2014 | Matsui | G06Q 10/02 |
| | | | | 705/5 |

FOREIGN PATENT DOCUMENTS

| | | |
|---|---|---|
| JP | 2008-204268 A | 9/2008 |
| JP | 2014-229147 A | 12/2014 |
| WO | 2014/098237 A1 | 6/2014 |

OTHER PUBLICATIONS

Written Opinion issued in Application No. PCT/JP2016/064611, dated Aug. 16, 2016 (4 pages).

Notice of Reasons for Rejection issued in corresponding Japanese Application No. 2015-104218, dated Dec. 22, 2015 (2 pages).

* cited by examiner

| CLIENT ID | ARRIVAL TIME OF LAST REQUEST | ASSIGNED WAIT TIME |
|---|---|---|
| 9000000000001 | 2014 08/12 23:00:21:921 | 3000msec |
| 9000000000002 | 2014 08/12 23:00:22:632 | 3000msec |
| 9000000000003 | 2014 08/12 23:00:22:997 | 3000msec |

INFORMATION PROCESSING SYSTEM, SERVER, AND PROGRAM, AND TERMINAL AND PROGRAM

TECHNICAL FIELD

The present invention relates to information processing systems, servers and programs, and terminals and programs.

BACKGROUND ART

As games that can be executed on terminals such as smartphones, games in which a plurality of players can participate, such as multi-battle games, have existed in the past (e.g., see Patent Literature 1).
In such games, the following request and response method is often adopted. Specifically, when a player operates a terminal to enter a command, the terminal sends the command as a request to a server. The server executes the request and sends the result of execution, etc. as a response to the terminal.
Patent Literature 1: Pamphlet of WO 2014/098237

DISCLOSURE OF THE INVENTION

Problems to be Solved by the Invention

With the recent advances in mobile computing, the number of clients (terminals) in games is increasing at an accelerating rate. Thus, a game is executed simultaneously by a huge number of terminals, so that there is a risk that requests from a large number of terminals become concentrated at a server, whereby the server becomes congested. Therefore, a technology for preventing server congestion is necessary in games in which the request and response method is adopted. However, there is no suitable technology for this purpose.

Specifically, for example, a method that is different from the request and response method is adopted in the technology disclosed in Patent Literature 1.

As other examples, parallelization and asynchronous I/O exist as existing technologies for decreasing server loads. However, these technologies are not suitable for games in which the request and response method is adopted.

Specifically, parallelization is a technology in which the number of computer resources (nodes) in a server infrastructure is increased. With this technology, additional servers are provided as the number of clients increases, thereby improving the processing ability of the server infrastructure as a whole so that a greater number of requests can be processed. Thus, in the case where parallelization is adopted, servers are additionally provided in an ad-hoc fashion as the server loads increase. However, it is not practical to provide additional servers in the field of games, in which the number of clients (terminals) is increasing at an extremely rapid pace. Furthermore, in the case where parallelization is adopted, it is necessary to prepare a huge number of computing nodes in the server infrastructure in advance. This would considerably increase the costs for maintaining the infrastructure and thus is not economical.

Asynchronous I/O is a technology in which a single thread or process carries out communications with a plurality of clients by utilizing wait times associated with I/O. With this technology, it is possible to improve the efficiency of CPU utilization by a server. However, with asynchronous I/O, a function for preventing congestion in the case where the number of clients (terminals) increases rapidly is not provided.

As described above, as a technology for preventing server congestion, there is no suitable technology for application to games in which the request and response method is adopted. It is to be noted that the request and response method is not particularly limited to games. That is, to state the above situation in other words, as a technology for preventing server congestion, there is no suitable technology for application to information processing systems in which the request and response method is adopted.

Furthermore, even if it becomes possible to prevent server congestion per se, it is necessary to avoid a situation in which a user (a player in the case of a game) operating a terminal feels unnecessary stress or gets bored as a result.

The present invention has been made in view of the situation described above, and it is an object thereof to establish a technology that can be suitably applied to an information processing system in which a request and response method is adopted, as a technology that prevents congestion at a server side and that prevents a user at a terminal side (a player in the case of a game) from feeling stress or getting bored.

Means for Solving the Problems

In order to achieve the above object, an information processing system according to an aspect of the present invention is: an information processing system including a server and a plurality of terminals that send certain requests to the server, wherein the server includes: monitoring means that monitors whether or not a predetermined condition regarding processing of requests is satisfied; wait-time calculating means that calculates a wait time before a request is sent at a terminal side in a case where the predetermined condition is not satisfied; request executing means that executes requests in the order of arrival thereof and that generates responses; and first sending control means that executes control to send the responses to the terminals that have sent the corresponding requests and to also send to the terminals information representing the wait time in a case where the wait time has been calculated, and wherein the terminal includes: command accepting means that accepts a certain command; wait-time setting means that sets a wait time identified from information representing the wait time in a case where the information is transmitted from the server and that sets a predetermined time as a wait time in a case where the information is not transmitted; display control means that controls the speed of time flow at the terminal side in accordance with the set wait time so as to control display of an image that changes at the speed of time flow; and second sending control means that executes control to send the command as a request to the server after the elapse of the set wait time.

A server according to an aspect of the present invention is: a server that carries out communications with a plurality of terminals that send certain requests, the server comprising: first monitoring means that monitors whether or not a predetermined condition regarding processing of requests is satisfied; wait-time calculating means that calculates a wait time as a time parameter for controlling the speed of time flow at a terminal side in a case where the predetermined condition is not satisfied; request executing means that executes requests in the order of arrival thereof and that generates responses; and sending control means that executes control to send the responses to the terminals that have sent the corresponding requests and to also send to the terminals information representing the wait time in a case where the wait time has been calculated.

A first program according to an aspect of the present invention is a program corresponding to the server according to the above-described aspect of the present invention.

A terminal according to an aspect of the present invention is: a terminal that carries out communications with a server that sends a response to a request to a terminal that has sent the request and that also sends to the terminal information representing a wait time before a next request is sent in a case where a predetermined condition is satisfied, the terminal comprising: command accepting means that accepts a certain command; wait-time setting means that sets a wait time identified from information representing the wait time in a case where the information is transmitted from the server and that sets a predetermined time as a wait time in a case where the information is not transmitted; display control means that controls the speed of time flow at the terminal side in accordance with the set wait time so as to control display of an image that changes at the speed of time flow; and sending control means that executes control to send the command as a request to the server after the elapse of the set wait time.

A second program according to an aspect of the present invention is a program corresponding to the terminal according to the above-described aspect of the present invention.

Effects of the Invention

According to the present invention, as a technology that prevents congestion at a server side and that prevents a user at a terminal side (a player in the case of a game) from feeling stress or getting bored, it is possible to establish a technology that can be suitably applied to an information processing system in which a request and response method is adopted.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images". Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
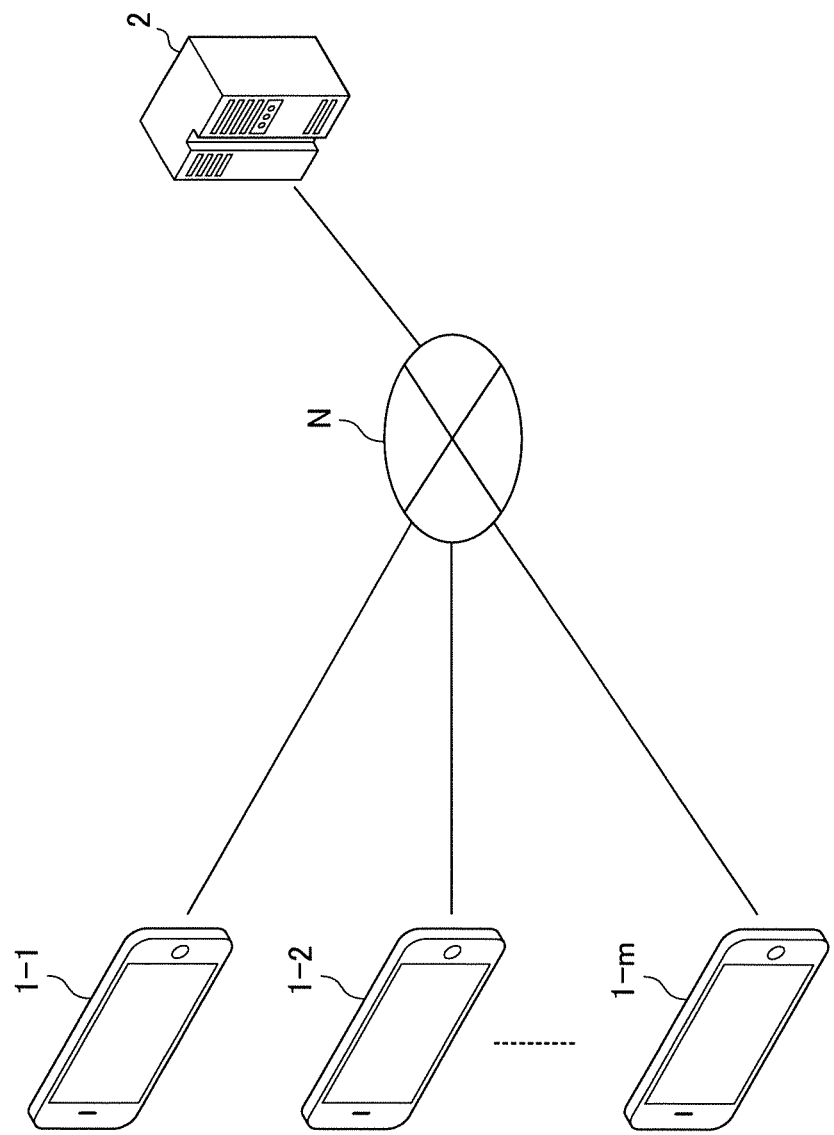
FIG. 1 is a block diagram showing the configuration of an information processing system according to an embodiment of the present invention.

FIG. 1 shows the configuration of an information processing system according to an embodiment of the present invention. The information processing system shown in FIG. 1 is a system including player terminals 1-1 to 1-*m* individually used by m players (m is an arbitrary integer greater than or equal to 1) and also including a server 2. The individual player terminals 1-1 to 1-*m* and the server 2 are connected to each other via a predetermined network N, such as the Internet.

The server 2 provides the individual player terminals 1-1 to 1-*m* with a game execution environment to provide various services relating to a game that is executed at the individual player terminals 1-1 to 1-*m*.

Hereinafter, in the case where there is no need for distinction among the individual player terminals 1-1 to 1-*m*, these will be referred to collectively as "player terminals 1".

Figure 2:
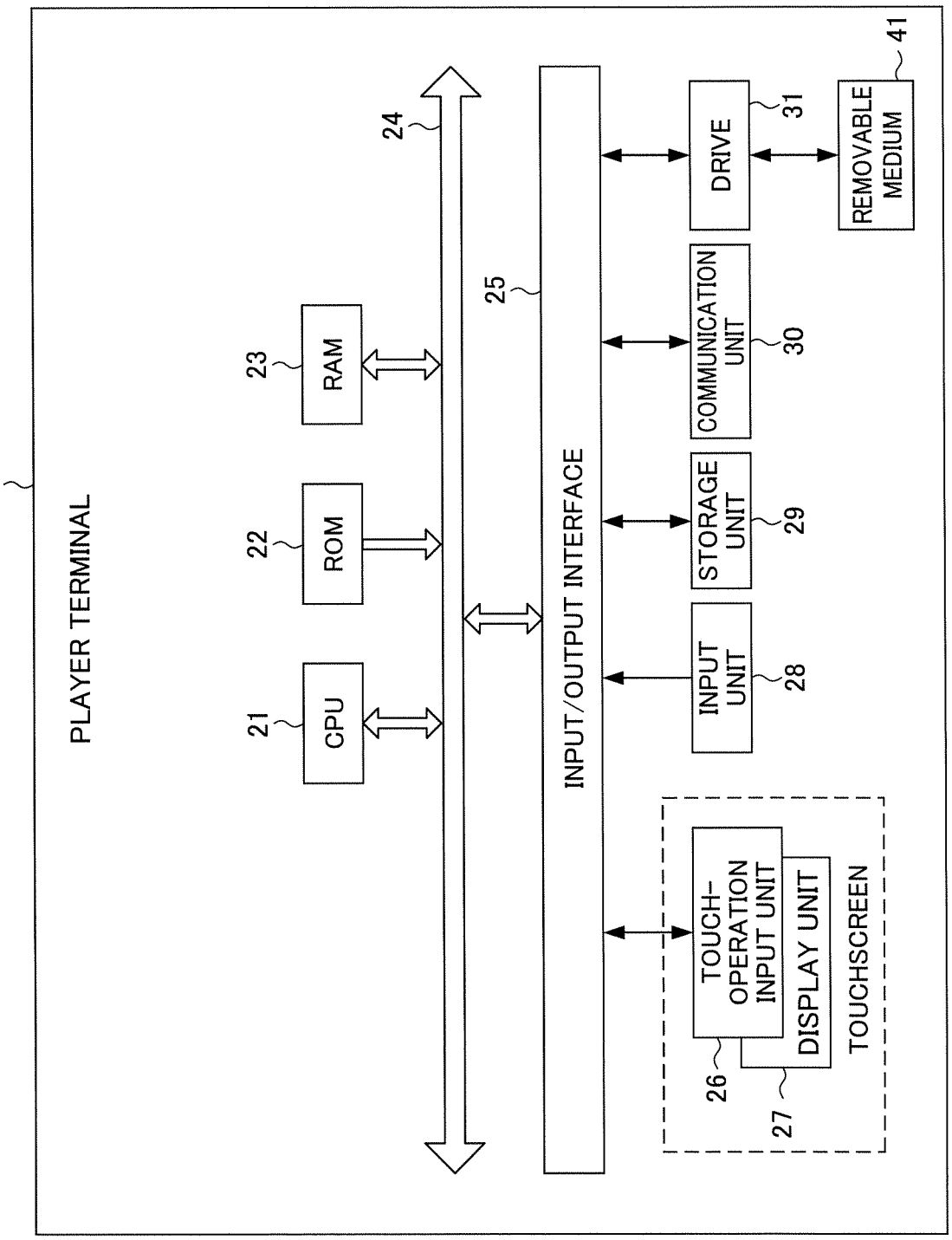
FIG. 2 is a block diagram showing, in the information processing system in FIG. 1, the hardware configuration of a player terminal as an embodiment of a terminal according to the present invention.

FIG. 2 is a block diagram showing, in the information processing system in FIG. 1, the hardware configuration of a player terminal 1 as an embodiment of a terminal according to the present invention.

The player terminal 1 is implemented by a smartphone or the like. The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23. The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed. The touch operation here refers to bringing something into contact with or in proximity to the touch-operation input unit 26. What is brought into contact with or in proximity to the touch-operation input unit 26 is, for example, a player's finger or a stylus. Hereinafter, a position at which a touch operation is performed will be referred to as a "touched position", and the coordinates of the touched position will be referred to as "touched coordinates". The display unit 17 is implemented by a display, such as a liquid crystal display, and displays various kinds of images, such as images related to the game. As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the player. The storage unit 29 is implemented by a DRAM (Dynamic Random Access Memory) or the like and stores various kinds of data. The communication unit 30 controls communications carried out with other devices (the server 2 and the other player terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
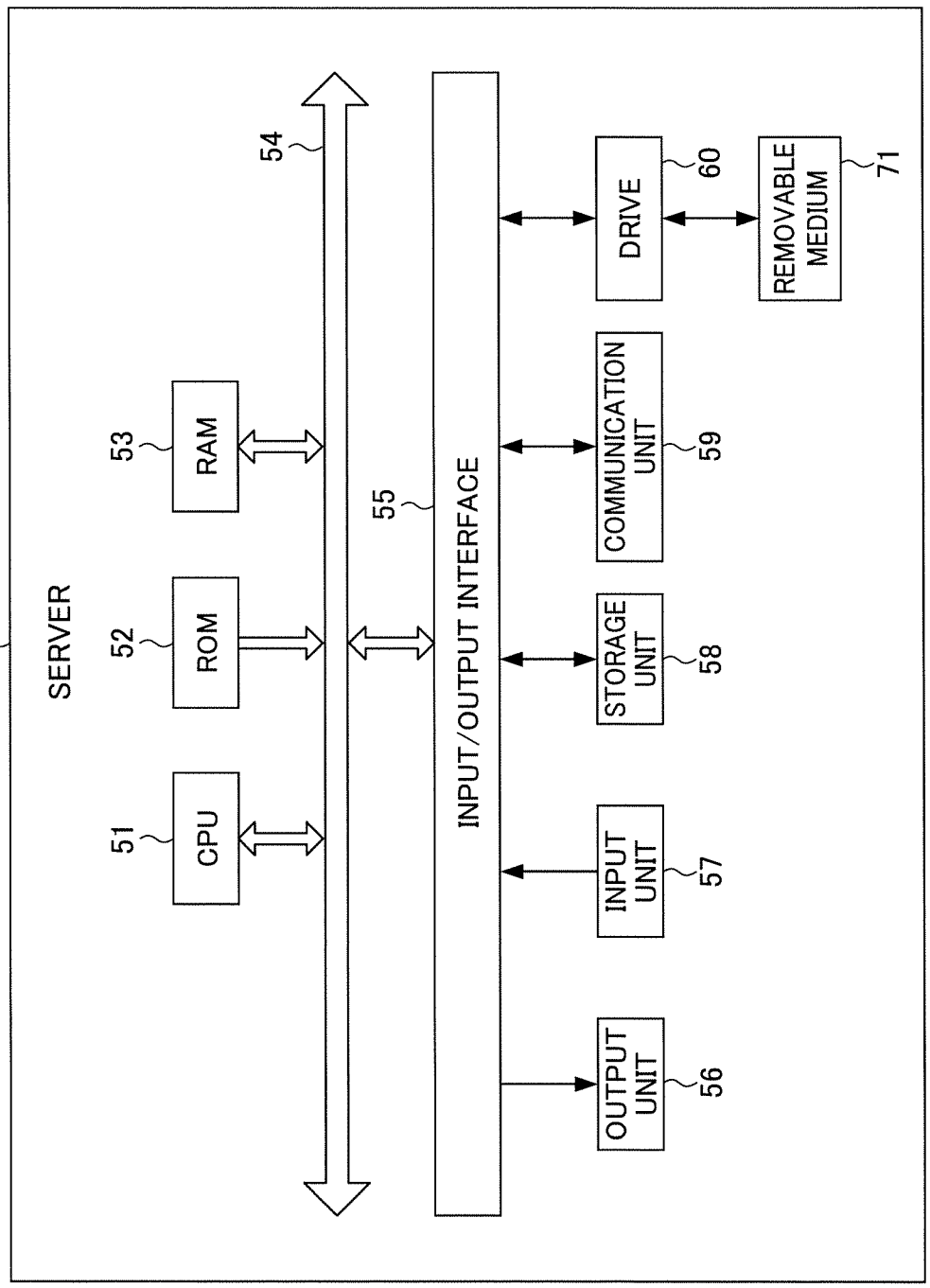
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60. Since the configuration of the server 2 is basically the same as that of the player terminal 1 with the touchscreen thereof removed, a description thereof will be omitted here.

Through cooperation between the various kinds of hardware and various kinds of software in the player terminal 1 in FIG. 2 and the server 2 in FIG. 3, it becomes possible to execute the game on the player terminal 1. This embodiment is directed to a game in which a plurality of players participate, such as a multi-battle game, and a request and response method is adopted. Specifically, in this embodiment, the individual player terminals 1 execute a game simultaneously and send commands for the game as requests to the server 2 from one to another. The server 2 receives the requests from the individual player terminals 1, sequentially executes the individual requests, and sends the individual execution results, etc. as responses to the individual player terminals 1. The individual player terminals 1 execute commands after receiving the responses.

Here, when requests are sent from a large number of player terminals 1 such that the amount of processing that can be executed by the server 2 during a unit time (peak) is exceeded, uncontrollable congestion occurs at the server 2. In this case, for the player terminals 1, the arrival of responses to the requests is delayed. Since this delay is not anticipated, there are cases where the users perceive that game commands are not being executed or are being executed very slowly, thus getting bored or feeling stress.

Figure 4:
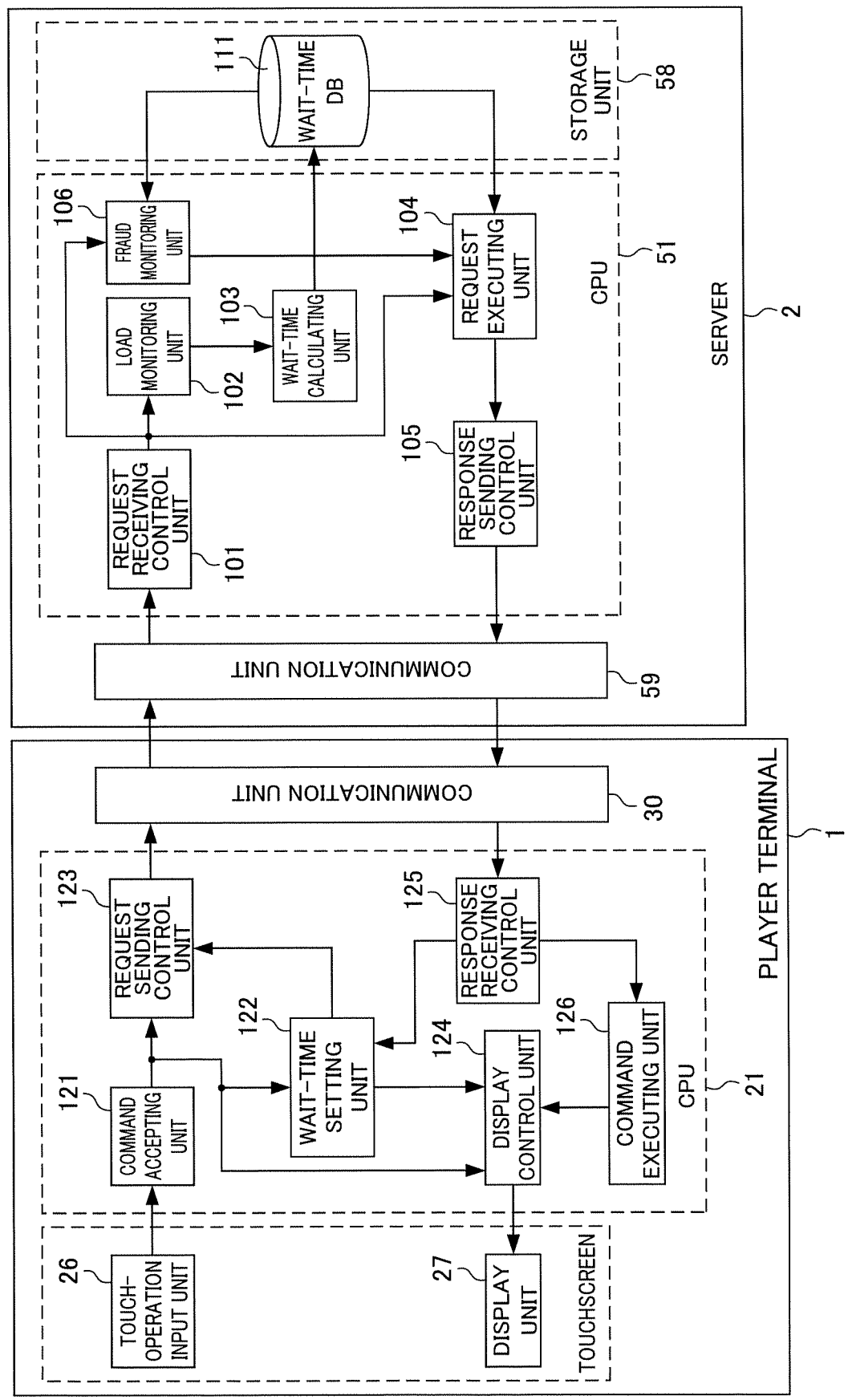
FIG. 4 is a functional block diagram showing an example of the functional configurations of the player terminal in FIG. 2 and the server in FIG. 3.

Accordingly, the player terminals 1 and the server 2 in this embodiment have functionality for preventing congestion at the server side and for preventing players on the terminal side from feeling stress or getting bored. FIG. 4 is a functional block diagram showing an example of the functional configurations of the player terminals 1 and the server 2 for exhibiting such functionality.

As shown in FIG. 4, the CPU 51 of the server 2 has functions for a request receiving control unit 101, a load monitoring unit 102, a wait-time calculating unit 103, a request executing unit 104, a response sending control unit 105, and a fraud monitoring unit 106. Furthermore, a wait-time DB 111 is provided in an area of the storage unit 58 of the server 2.

The request receiving control unit 101 controls the reception of requests sent from the player terminals 1 by the communication unit 59. The load monitoring unit 102 monitors whether or not a predetermined condition regarding request processing is satisfied. The predetermined condition may be any condition relating to requests. For example, it is possible to adopt a condition that the number of current requests does not exceed a predetermined threshold. Specific examples of the predetermined threshold, the predetermined condition, etc. will be described later.

In the case where the predetermined condition is not satisfied (e.g., in the case where a threshold for the number of requests that can be processed per unit time is exceeded), the wait-time calculating unit 103 calculates wait times before requests may be sent at the player terminals 1 and stores the results of calculation in the wait-time DB 111. Here, the "wait times" refer to time parameters before the player terminals 1 are permitted to send a next request, which serve to control the elapse of time (the speed of time flow) in the game being executed at the player terminals 1. For example, the wait times are calculated as relative values in the form of "current time plus a certain number of seconds". Specifically, the wait-time DB 111 stores a list of information about wait times, etc. for the individual player terminals 1 (the player terminals 1-1 to 1-$m$ in this embodiment). A specific example of the list stored in the wait-time DB 111 will be described later with reference to FIG. 6.

The request executing unit 104 executes requests in the order of arrival and generates responses. The response sending control unit 105 executes control to send responses to the player terminals 1 that have sent the associated requests and to also send information representing wait times, if wait times have been calculated, to the player terminals 1.

As will be described later in detail, in the case where information representing a wait time is received together with a response, each of the plurality of player terminals 1 sends a next request to the server 2 after the elapse of the wait time from the timing at which a command or the like is accepted. As described above, the server 2 sets wait times for the individual player terminals 1 before uncontrollable congestion occurs (as a result of the predetermined condition no longer being satisfied). That is, the server 2 controls the frequency at which requests are sent from the individual player terminals 1. Accordingly, proactive load-balancing processing along the time-axis direction (hereinafter referred to as "proactive load-balancing processing"), in which the plurality of player terminals 1 are individually assigned short wait times, is realized.

Figures 5, 6:
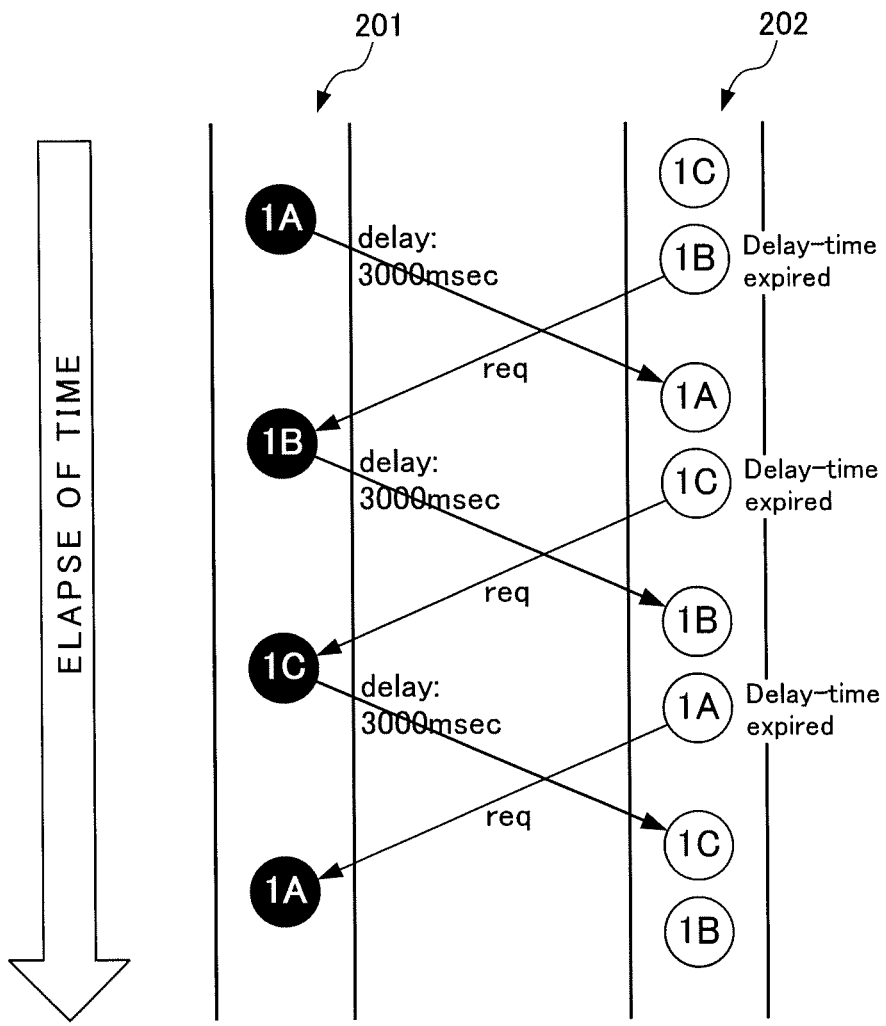
FIG. 5 is a schematic illustration for explaining an overview of proactive load-balancing processing executed by the server having the functional configuration in FIG. 4.
FIG. 6 is a diagram showing an example of a list stored in a wait-time DB in FIG. 5.

The proactive load-balancing processing will be further described below with reference to FIG. 5. FIG. 5 is a schematic diagram for explaining an overview of the proactive load-balancing processing.

A request buffer 201 on the left side of FIG. 5 is a buffer for processing requests and actually exists at the server 2. For example, although not shown in FIG. 4 and other figures, the request buffer 201 exists in the storage unit 58 in this embodiment. The black circles in the request buffer 201 represent requests that have been sent by certain player terminals 1 and received by the server 2. That is, the black circles represent requests that are being executed or waiting to be executed by the request executing unit 104 at the server 2. Here, the signs in the black circles represent the player terminals that have sent the requests. That is, the black circle labeled as 1A represents a request sent from the player terminal 1-A. The black circle labeled as 1B represents a request sent from the player terminal 1-B. The black circle labeled as 1C represents a request sent from the player terminal 1-C. The request buffer 201 is an FIFO queue that stores requests in the order of arrival at the server 2 and that outputs the requests in the order of arrival to the request executing unit 104 for execution.

A virtual queue 202 on the right side of FIG. 5 is a queue that is configured virtually by notifying the individual player terminals 1 (the player terminals 1-A, 1-B, and 1-C for convenience of explanation in the example in FIG. 5) of wait times from the server 2. The white circles in the virtual queue 202 represent requests yet to be sent from certain player terminals 1. That is, the white circles represent requests that are delayed for delay times before being sent after commands are entered at the player terminals 1. Requests for which delay times have elapsed and that are allowed to be sent are labeled with "Delay-time expired". That is, the virtual queue 202 is not constructed by consuming a memory area or disk area on the server 2. Instead, the virtual queue 202 is configured by the operation wherein the individual player terminals 1 wait to send next requests before the elapse of wait times included in notifications from the server 2, whereby the individual player terminals 1 essentially behave as if lining up in a single queue.

In the example in FIG. 5, a wait time of 3000 ms is set for each of the plurality of player terminals 1-A, 1-B, and 1-C. The requests are executed in the order of storage in the request buffer 201. In other words, at least one request is executed at a single particular timing. In the case where the requests do not have mutual dependencies, the server 2 may fetch a plurality of requests at once from the request buffer 201 and execute the requests in parallel. For example, the second request from the top of the virtual queue 202 is a request for which a wait time has elapsed at the player terminal 1-B. Thus, the request is sent from the player terminal 1-B to the server 2, is stored in the request buffer 201 of the server 2, and is executed by the request executing unit 104 when requests stored prior to that request no longer exist in the request buffer 201. When the request (the second request from the top of the request buffer 201) is executed by the request executing unit 104 in this way, the response sending control unit 105 sends a response to the player terminal 1-B and also notifies the player terminal 1-B of a wait-time value "3000 ms". The wait-time value that the player terminal 1-B is notified of in this way is the greatest among wait-time values for all the player terminals 1 (the player terminals 1-A, 1-B, and 1-C in the example in FIG. 5) from the viewpoint of time remaining before it becomes possible to send a request. Thus, the next request is added at the tail of the virtual queue 202 (the fifth white circle from the top in the example in FIG. 5).

What needs attention here is that P2P communication between player terminals 1 is not involved in the proactive load-balancing processing described with reference to FIG. 5, and the frequency of access to the server 2 is determined for each of the plurality of player terminals 1 autonomously and in a distributed fashion at the server 2. Accordingly, the total number of requests arriving at the server 2 during a unit time is regulated, whereby congestion at the server 2 is prevented.

Specifically, in this embodiment, in order to regulate the total number of requests arriving at the server 2 during a unit time, the number of requests that the server 2 can process during the unit time (hereinafter referred to as the "capacity number") is estimated in advance. Furthermore, a certain threshold (e.g., a value corresponding to 80% of the capacity number) is predefined on the basis of the capacity number, and the condition that the current number of requests does not exceed the threshold is also preset. That is, the load monitoring unit 102 monitors the load status of the server 2 by monitoring whether or not the condition is satisfied.

In the case where the above condition is not satisfied, i.e., in the case where the number of current requests exceeds the threshold (such a case will hereinafter be referred to as a case of "large load"), the wait-time calculating unit 103 calculates a wait time, for example, according to equation (1) below.

$$\text{delay\_sec} := \frac{\text{requests\_per\_sec}}{\text{capacity\_per\_sec}}, \qquad [\text{Eq. 1}]$$

In equation (1), delay_sec signifies a wait time, request_per_sec signifies the number of requests arriving at the server 2 per second, and capacity_per_sec signifies the number of requests that the server 2 can process per second. That is, in this embodiment, a value obtained by dividing the number of current requests (request_per_sec) by the capacity number (capacity_per_sec) is adopted as a wait time (delay_sec). By adopting this value, in the case where a number of requests exceeding the capacity number are to arrive during a unit time (i.e., in the case of large load), excess requests are stored in the virtual queue 202 in FIG. 5. Accordingly, as described earlier with reference to FIG. 5, control with which only requests that can be processed during the unit time arrive at the server is realized.

The method of calculating a wait time is not particularly limited to the method according to equation (1) in this embodiment. For example, a method in which different wait times are calculated for individual requests in consideration of the performance of the network N, the DB write performance, etc. may be adopted.

The request executing unit 104 executes the requests in the order of storage (in the order of arrival) in the request buffer 201 in FIG. 5 and generates responses. The response sending control unit 105 sends the responses to the player terminals 1 that have sent the associated requests and notifies the player terminals 1 of the wait time described above.

Each of the plurality of player terminals 1 (the player terminals 1-A, 1-B, and 1-C in the example in FIG. 5) accesses the server 2 after the elapse of the wait time included in the notification when sending a next request.

In this way, a wait time is set for each of the plurality of player terminals 1 when a response is sent. Here, the timing of sending a response slightly varies among the individual player terminals 1. As a result, as shown in FIG. 5, described earlier, the individual player terminals 1 have slightly different wait times (times remaining before sending next requests). That is, it appears as if a huge number of player terminals 1 (requests to be sent) were stored in the huge virtual queue 202. This prevents congestion at the server 2.

It is to be noted that the positions in the virtual queue 202 are not strict and may slightly vary depending on the performance of the network N used for sending wait-time notifications and requests; however, this does not particularly raise any problem in the case of application to the field of games. Furthermore, the calculations for queuing for sending requests from the virtual queue 202 to the request buffer 201 on the server 2 do not involve comparisons between player terminals 1 and are realized just by setting wait times. Thus, the queuing can always be performed at $0(n)$ cost.

However, if the plurality of player terminals 1 are just notified of such wait times, there is a risk that illegitimate player terminals 1 that do not observe the wait times might arise. Thus, the server 2 in this embodiment also has the function of the fraud monitoring unit 106, as shown in FIG. 4. The fraud monitoring unit 106 monitors whether or not a wait time has been observed when a request received under the control of the request receiving control unit 101 was sent from a player terminal 1.

Specifically, for example, in this embodiment, a list shown in FIG. 6 is stored in the wait-time DB 111. A certain single line of the list in FIG. 6 corresponds to a certain single player terminal 1. That is, in a certain single line, the client ID, the arrival time of the last request, and the assigned wait time for the corresponding player terminal 1 are stored. In other words, the wait-time DB 111 manages the arrival time of the immediately preceding request (the arrival time of the last request) and the wait time in association with each other. Thus, the fraud monitoring unit 106 searches the wait-time DB 111 by using the client ID included in a request and compares "the arrival time of the last request"+"the assigned wait time" with the actual arrival time of the request. Then, the fraud monitoring unit 106 determines whether or not the player terminal 1 that has sent the request is illegitimate on the basis of the comparison result. For a player terminal 1 determined as being illegitimate, predetermined penalizing processing is executed. The specifics of the penalizing processing are not particularly limited. For example, in the processing adopted in this embodiment, requests from an illegitimate player terminal 1 are discarded, and responses are not sent.

It is to be noted that, from a viewpoint such as large costs that would be incurred if the legitimacy of all requests were verified, for example, the fraud monitoring unit 106 may verify only some of the requests, more specifically, about 10% randomly extracted from all the requests. In this case, as the penalizing processing, for example, it is possible to adopt processing in which requests from a player terminal 1 recognized as conducting fraud are discarded for a predetermined period (e.g., five minutes).

The functional configuration of the server 2 for realizing the proactive load-balancing processing (see FIG. 5) has been described above. Next, the functional configuration of the player terminal 1 when the proactive load-balancing processing is executed will be described.

As shown in FIG. 4, the CPU 21 of the player terminal 1 has the functions of a command accepting unit 121, a wait-time setting unit 122, a request sending control unit 123, a display control unit 124, a response receiving control unit 125, and a command executing unit 126.

While the game is being executed, a player enters predefined commands by performing predetermined touch operations (e.g., tap operations) on the touch-operation input unit 26 in a state where a screen that allows input of commands (which will be described later with reference to FIGS. 7 to 9) is displayed on the display unit 27. The command accepting unit 121 accepts such predefined commands.

In the case where information representing a wait time is transmitted from the server 2, the wait-time setting unit 122 sets a wait time identified from the information. On the other hand, in the case where such information is not transmitted, the wait-time setting unit 122 sets a certain time as a wait time. Here, the certain time is not particularly limited and may be a preset fixed time or a variable time. Furthermore, the certain time includes 0. Here, a wait time of 0 means that when a command is accepted, the command is sent immediately as a request.

After the elapse of the wait time set by the wait-time setting unit 122, the request sending control unit 123 sends a command as a request to the server 2 via the communication unit 30.

The proactive load-balancing processing is realized with these functions of the command accepting unit 121, the wait-time setting unit 122, and the request sending control unit 123 working at the player terminal 1 side, as described above.

However, the player nonetheless has to wait for the wait time after entering a certain command until the certain command is executed. In this case, unless some measure is taken at the player terminal 1 side, the player might get bored or feel some stress.

What is important here is that it has hitherto been presupposed that the input of a command and the execution of the command are synchronized at the player terminal side. That is, it has hitherto been the case for players to believe that a command entered will be executed immediately. Thus, for a terminal or a player, if it takes a long time after a command is entered until a request corresponding to the command is transmitted to a server, a response from the server arrives, and the command is executed on the basis of the response, the time is considered as an "unanticipated wait time". That is, the occurrence of the "unanticipated wait time" due to the occurrence of congestion at a conventional server is not anticipated by the terminal or the player. It is difficult to take some measure on the terminal side against such "unanticipated wait time" in advance. Thus, a conventional terminal at which no measure is taken is kept in a wait state until the elapse of the "unanticipated wait time". That is, for the player or the terminal, the time during which the wait state continues after a command is entered instead of the command being executed immediately is the "unanticipated wait time". Moreover, the duration of the "unanticipated wait time" varies depending on the congestion status at the server side, which is not known to the player or the terminal. Thus, when an "unanticipated wait time" occurs and the terminal enters a wait state, the player cannot predict when the command will be executed. This makes the player get bored or feel some stress.

In contrast, the "wait time" in this embodiment is a time parameter intentionally generated at the server 2 side, which is an idea essentially different from the conventional "unanticipated wait time". That is, it is anticipated by the player terminal 1 that such a "wait time (time parameter)" will arrive. Thus, it becomes possible to take a measure on the player terminal 1 side by using the "wait time (time parameter)" so that the player will not get bored or feel stress. Specifically, in this embodiment, at the player terminal 1, the input of a command and the execution of the command are not synchronized with each other, and the speed of time flow from the input of the command to the execution of the command is controlled in accordance with the "wait time (time parameter)". Furthermore, the player terminal 1 visually presents the player with the speed of time flow. With this measure, it becomes possible to prevent the player from getting bored or feeling stress. More specifically, in this embodiment, the display control unit 124 prevents the player from getting bored or feeling stress by executing control so as to display game screens shown in FIGS. 7 to 9 on the display unit 27.

Figure 7:
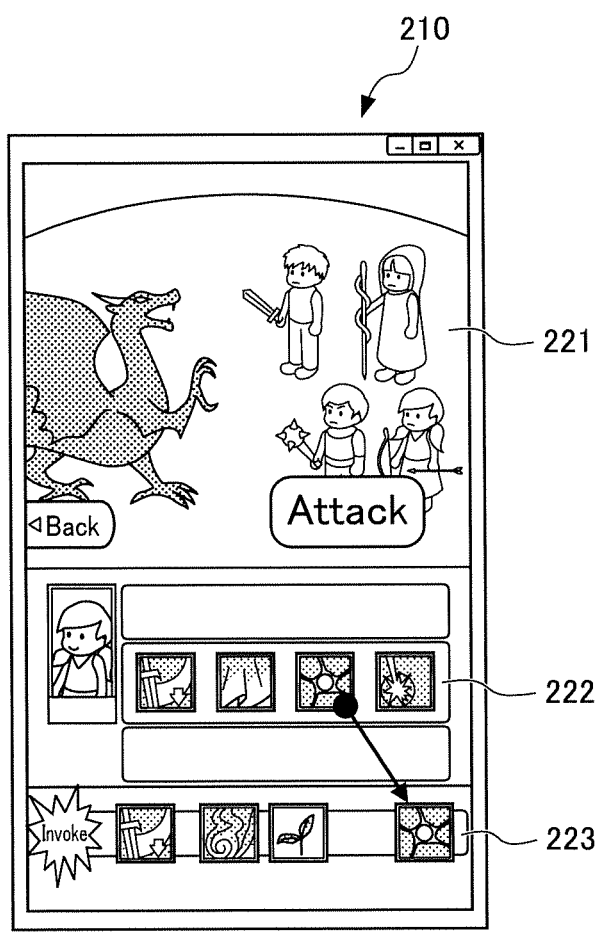
FIG. 7 is an illustration showing an example of a game screen in the embodiment.

FIG. 7 is an illustration showing an example of a game screen in this embodiment. In an upper part of a game screen 210 in FIG. 7, for example, a battle screen 221 in an RPG (Role Playing Game) is displayed. Under the battle screen 221, a button-set area 222 including buttons for allowing the player to select commands (hereinafter referred to as "command selecting buttons") is displayed. Furthermore, under the button-set area 222, a command queue 223 in which icons representing commands (hereinafter referred to as "command icons") appear to flow in one direction is displayed.

The player performs a tap operation on a desired command selecting button among the one or more command selecting buttons disposed in the button-set area 222 to enter a corresponding command. The command queue 223 is implemented as an FIFO (First-in, First-out) queue. Thus, the command icon corresponding to the command entered by the player (the tapped command selecting button) is added at the tail of the command queue 223 (the right end in the example in FIG. 7). That is, when the player performs tap operations on a plurality of kinds of command selecting buttons, a plurality of kinds of command icons are sequentially stored in the command queue 223 in the order of the tap operations and are sequentially moved leftward in the command queue 223. Then, the commands corresponding to the command icons are executed in the order of arrival at the left end (the end labeled with the text string "Invoke" in the example in FIG. 7). Here, the speed of movement of the command icons in the command queue 223 is not constant but changes depending on the wait time. That is, the speed of movement of the command icons becomes slower as the wait time set from the server 2 becomes longer. In other words, considering the wait-time notification from the server 2 as an instruction from the server 2, the speed of movement of the command icons in the command queue 223 is adjusted according to the instruction from the server 2.

As described above, the speed of movement of the command icons in the command queue 223 corresponds to the speed of time flow at the player terminal 1 side, which is controlled according to the "wait time (time parameter)" set by the server 2. Thus, the speed of time flow up to the invocation (execution) of a command is visualized for the player. That is, the player can readily recognize visually the time to wait before the command gets invoked. This prevents the player from feeling much stress and enables the player to wait until the command gets invoked without getting bored.

In other words, by introducing the command queue 223 described above, asynchronous input of commands and speed control of the time flow at the player terminal 1 side as well as visualization thereof are realized. As a result, it becomes possible to realize proactive load-balancing processing without making the player feel stress or get bored. Now, asynchronous input of commands will be described.

The command selecting buttons themselves, disposed in the button-set area 222, are those that have conventionally been used in ordinary games, such as RPGs. Conventionally, when a command selecting button is pressed at a client (a conventional terminal corresponding to the player terminal 1 in this embodiment), a request is sent to a conventional server, and a command is executed after a response is received from the server. Since the time taken from the sending of the request to the receiving of the response is usually short, the player perceives that the pressing of the command selecting button and the execution of the command are synchronized with each other. Thus, when the loads of the server becomes large and a time lag occurs between the pressing of the command selecting button and the execution of the command, the player feels stress or gets bored.

In contrast, in this embodiment, a UI (User Interface) that presupposes that there is a time lag between the timing of pressing a command selecting button and the execution of a command is adopted. Such a UI enables asynchronous input of commands. Furthermore, the duration of the time lag is controlled variably depending on the wait time (time parameter) assigned by the server 2, and the result of this variable control, i.e., the speed of time flow, is visualized. Specifically, when a command selecting button is pressed, a corresponding command icon is stored in the command queue 223 and begins to move leftward. The speed of movement of the command icon corresponds to the speed of time flow at the terminal 1 side, which is controlled variably in accordance with the wait time designated from the server 2. Then, after the elapse of the wait time designated from the server 2, a request is sent to the server 2. Since the proactive load-balancing processing is being executed at the server 2 side, a response is sent in a short time, without the server 2 suffering from large loads. Then, the response receiving control unit 125 in FIG. 4 executes control to receive the response. Here, in the case where information representing a wait time is also transmitted, the response receiving control unit 125 also receives the information and supplies the information to the wait-time setting unit 122. When the response is received, the command executing unit 126 executes a command.

The player can readily recognize the current proceeding of the above series of processing steps, i.e., the time that will be taken before the command is executed, by viewing the status of movement of the corresponding command icon in the command queue 223. Thus, the player can wait for the execution of the command without feeling stress or getting bored.

Furthermore, by adopting such asynchronous command input, it also becomes possible to edit commands. Specifically, when asynchronous command input is adopted, after entering a certain first command, the player can further enter a second command before the first command is executed. That is, it becomes possible to enter a plurality of kinds of commands before one kind of command is executed. Thus, it becomes possible to edit a command before the command is sent as a request.

Figure 8:
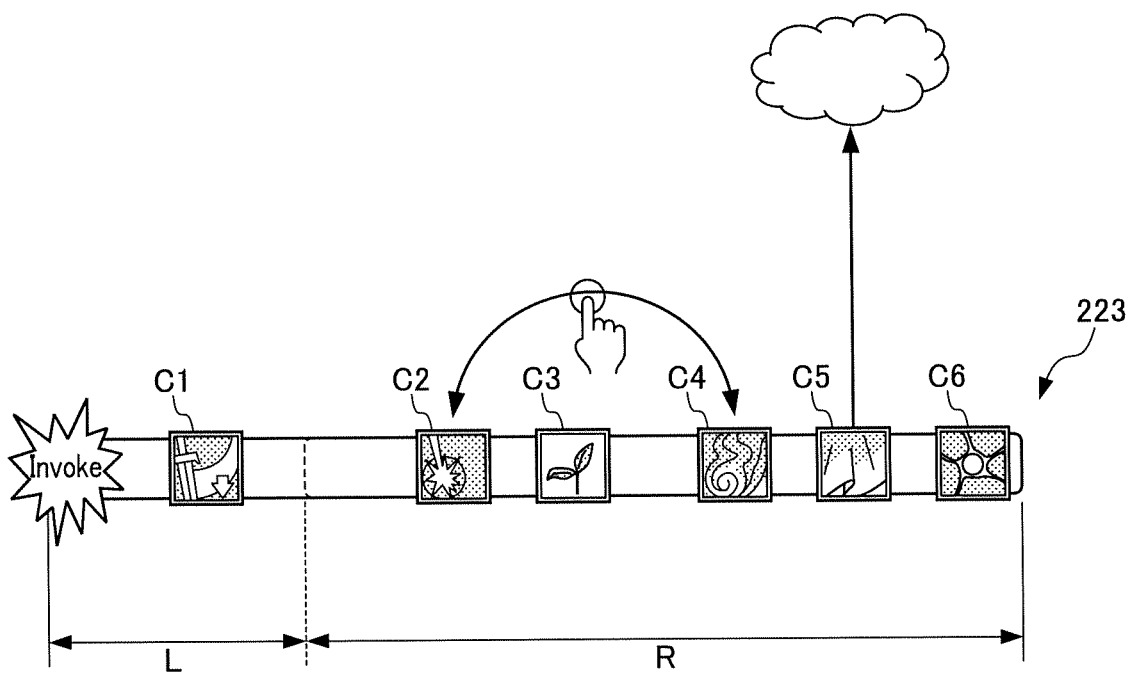
FIG. 8 is a schematic illustration for explaining editing of commands.

FIG. 8 is a schematic illustration for explaining editing of commands. In the example in FIG. 8, first to sixth commands of six kinds are sequentially entered in that order, and command icons C1 to C6 respectively corresponding to the first to sixth commands are stored in that order in the command queue 223. Here, the position at which a command icon is stored when a command is entered will hereinafter be referred to as a "first position". The individual command icons C1 to C6 are sequentially moved leftward in that order at a movement speed corresponding to the wait time (time parameter).

Here, since the movement speed of command icons (the speed of time flow at the player terminal 1 side) is changed in accordance with the wait time, it becomes possible to send a request when a command icon reaches a predetermined position in the command queue 223. The predetermined position that a command icon reaches when a request is sent will hereinafter be referred to as a "second position". In the command queue 223, command icons existing in a right-side range R from the first position to the second position correspond to commands for which requests have not been sent. Thus, the player can freely edit these commands. That is, in the example in FIG. 8, the second to sixth commands corresponding to the command icons C2 to C6 can be edited. On the other hand, command icons existing in a left-side range L from the second position to a position at which a command is executed (the position labeled with the text string "Invoke" in the example in FIG. 8 and hereinafter referred to as a "third position") correspond to commands for which requests have already been sent and responses are being awaited. Thus, the player cannot edit these commands. That is, in the example in FIG. 8, the first command corresponding to the command icon C1 cannot be edited.

The operation, etc. for editing a command is not particularly limited. For example, in this embodiment, as shown in FIG. 8, the player can edit a command corresponding to a command icon by performing a predetermined touch operation on the command icon. Specifically, for example, the player can cancel the fifth command corresponding to the command icon C5 by moving the command icon C5 outside of the command queue 223 by a drag operation. As another example, the player can change the order of execution (invocation) of the second and fourth commands respectively corresponding to the command icons C2 and C4 by exchanging the orders (positions) of the command icons C2 and C4 by a drag operation.

As described above, when the speed of movement of the command icons in the command queue 223 is decreased, i.e., when a wait time is set from the server 2, the player can perform tap operations on the command selecting buttons disposed in the button-set area 222 or perform drag operations on the command icons in the command queue 223 to add or edit the corresponding commands. Here, the kinds of command editing are not particularly limited, and arbitrary kinds may be adopted, such as the cancelling and order changing described above.

Accordingly, compared with the conventional method, in which asynchronous command input is not adopted, the player can enter a plurality of kinds of commands at high speed and change them as appropriate in accordance with the game status, etc., thereby constructing deeper strategies for the game.

Figure 9:
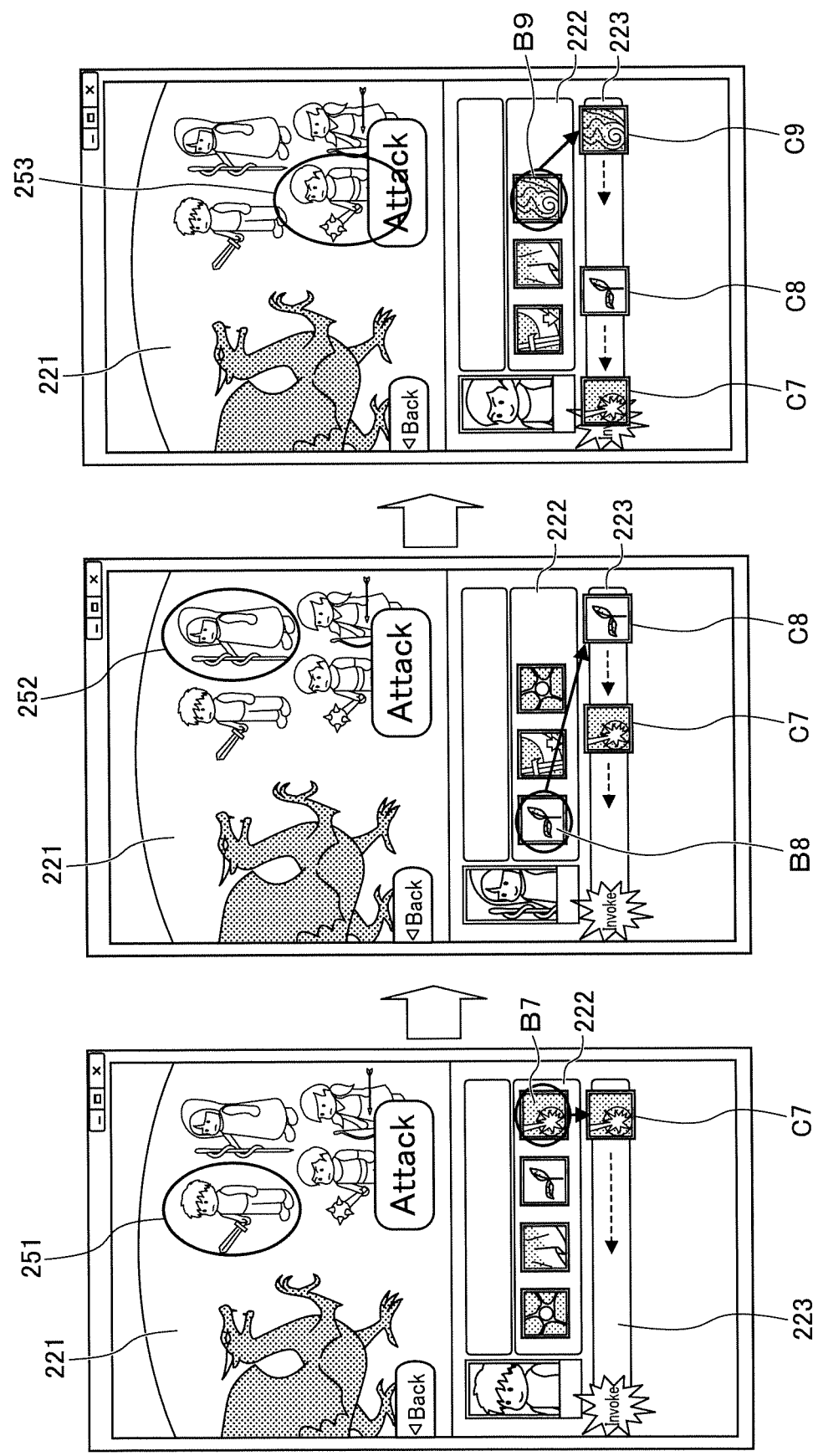
FIG. 9 is an illustration of the transition of the game screen, showing a specific example of asynchronous command input.

FIG. 9 is an illustration showing game screen transitions in a specific example of asynchronous command input.

In a state where a game screen on the left side of FIG. 9 is displayed, the player can select a first character inside a frame 251 (the frame 251 need not actually be displayed) among characters displayed in the battle screen 221 by performing a tap operation on the first character. Then, the button-set area 222 including a plurality of command selecting buttons is displayed as a list of a plurality of commands possessed by the first character. Here, let it be supposed that the player performs a tap operation on a command selecting button B7. Then, a command icon C7 corresponding to the command selecting button B7 is added at the first position at the tail of the command queue 223 and begins to move leftward.

Then, as shown in a game screen at the middle of FIG. 9, the player can select a second character inside a frame 252 (the frame 252 need not actually be displayed) among the characters displayed in the battle screen 221 by performing a tap operation on the second character. Then, the button-set area 222 including a plurality of command selecting buttons is displayed as a list of a plurality of commands possessed by the second character. Here, let it be supposed that the player performs a tap operation on a command selecting button B8. Then, a command icon C8 corresponding to the command selecting button B8 is added at the first position at the tail of the command queue 223 and begins to move leftward. In the meantime, the command icon C7 is moved further leftward. As described above, by adopting asynchronous command input, it becomes possible to enter a next command even before a command entered earlier is sent to the server 2 as a request.

Then, as shown in a game screen on the right side of FIG. 9, the player can select a third character inside a frame 253 (the frame 253 need not actually be displayed) among the characters displayed in the battle screen 221 by performing a tap operation on the third character. Then, the button-set area 222 including a plurality of command selecting buttons is displayed as a list of a plurality of commands possessed by the third character. Here, let it be supposed that the player performs a tap operation on a command selecting button B9. Then, a command icon C9 corresponding to the command selecting button B9 is added at the first position at the tail of the command queue 223 and begins to move leftward. In the meantime, the command icon C8 is moved further leftward. The command icon C7 passes by the second position, which is located further leftward (as a result, a corresponding command is sent to the server 2 as a request, and a response from the server 2 is received), and arrives at the third position. Thus, the command entered in the game screen on the left side of FIG. 8, i.e., the command corresponding to the command icon C7 (the command selecting button B7), is executed at this time.

The functional configurations of the player terminal 1 and the server 2 for realizing the proactive load-balancing processing and asynchronous command input have been described above with reference to FIGS. 4 to 9. Next, the flows of processing executed by the player terminal 1 and the server 2 having the above functional configurations will be described with reference to FIGS. 10 and 11.

Figure 10:
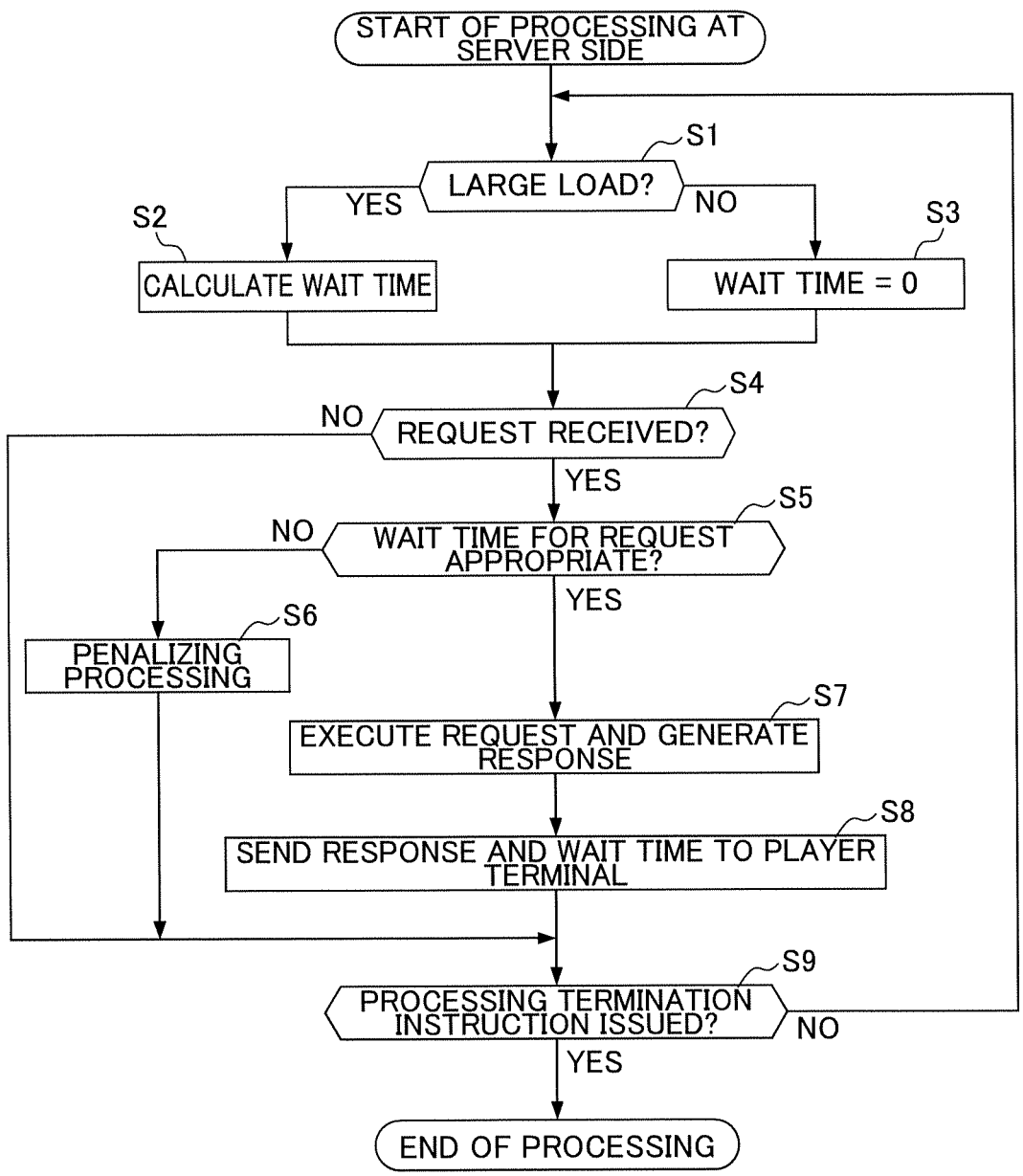
FIG. 10 is a flowchart for explaining an example of the flow of processing executed at the side of the server having the functional configuration in FIG. 4.

FIG. 10 is a flowchart for explaining the flow of processing executed at the server 2 side. In step 91, the load monitoring unit 102 determines whether or not the loads are large. Specifically, the load monitoring unit 102 monitors on the basis of the resource usage status of the server 2 whether or not the condition that the number of current requests does not exceed the predetermined threshold based on the capacity number is satisfied. In the case where the above condition is satisfied, i.e., in the case where the number of current requests does not exceed the threshold, the determination in step S1 results in NO, and the processing proceeds to step S3. In step S3, the wait-time calculating unit 103 calculates the wait time as 0. On the other hand, in the case where the above condition is not satisfied, i.e., the number of current requests exceeds the threshold, considering that the loads are large, the determination in step S1 results in YES, and the processing proceeds to step S2. In step S2, the wait-time calculating unit 103 calculates a wait time, for example, according to equation (1) given earlier.

In step S4, the request receiving control unit 101 determines whether or not there is any request.

In the case where there is no request, the determination in step S4 results in NO, and the processing proceeds to step S9. In step S9, the CPU 51 of the server 2 determines whether or not a processing termination instruction has been received. Here, although the processing termination instruction is not particularly limited, a power shutoff of the server 2 is adopted in this embodiment. That is, when the power is shut off at the server 2, the determination in step S9 results in YES, and the processing at the server 2 is terminated. On the other hand, unless the power is shut off at the server 2, the determination in step S9 results in NO, and the processing returns to step S1, and the subsequent processing is repeated.

Here, when a request is sent from a certain one of the plurality of player terminals 1 (the player terminals 1-1 to 1-m in the example in FIG. 1), the determination in step S4 results in YES, and the processing proceeds to step S5.

In step S5, the fraud monitoring unit 106 determines whether or not the wait time for the request is appropriate.

Specifically, the fraud monitoring unit 106 searches the list stored in the wait-time DB 111 (see FIG. 9) for a wait time, etc. associated with the client ID included in the request. In the case where the request is transmitted at a timing earlier than an appropriate time identified on the basis of the search result, considering that the request is illegitimate, the determination in step S5 results in NO, and the processing proceeds to step S6. In step S6, the fraud monitoring unit 106 executes penalizing processing for the illegitimate player terminal 1 that has sent the request. Then, the processing proceeds to step S9, and the subsequent processing is repeated. On the other hand, in the case where the wait time for the request is appropriate, the determination in step S5 results in YES, and the processing proceeds to step S7. In step S7, the request executing unit 104 executes the request and generates a response. In step S8, the response sending control unit 105 sends the response and the wait time to the player terminal 1. Then, the processing proceeds to step S9, and the subsequent processing is repeated.

Figure 11:
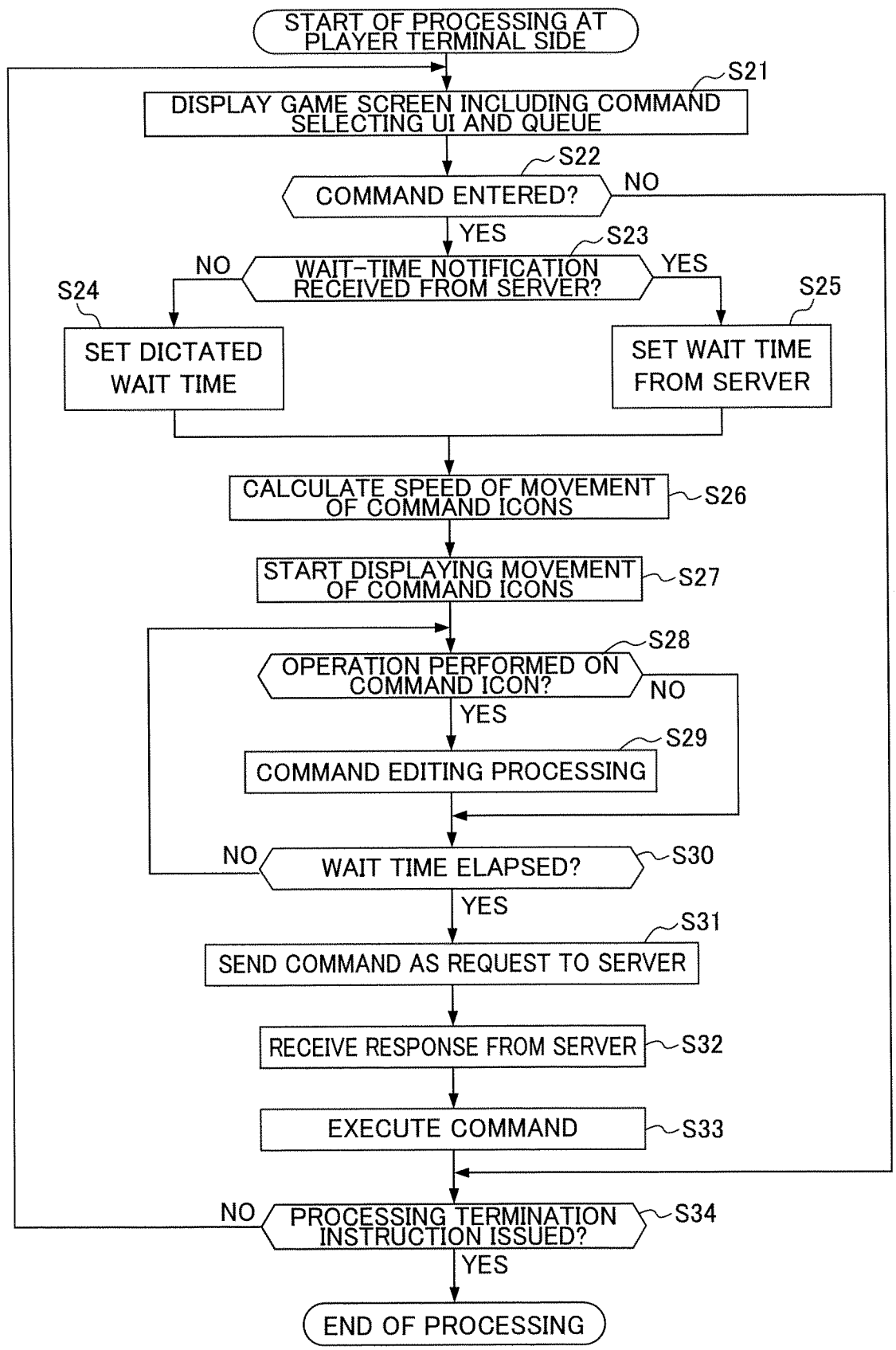
FIG. 11 is a flowchart for explaining an example of the flow of processing executed at the player terminal having the functional configuration in FIG. 4.

As opposed to the above-described processing executed at the server 2 side, FIG. 11 shows the flow of processing executed at the player terminal 1 side. FIG. 11 is a flowchart for explaining the flow of the processing executed at the player terminal 1 side. The processing executed at the player terminal 1 side, shown in FIG. 11, is triggered by a certain event during the execution of the game, such as a battle event in an RPG.

In step S21, the display control unit 124 displays a game screen including a command selecting UI and a queue on the display unit 27. Here, the command selecting UI corresponds to, for example, the button-set area including command selecting buttons, described earlier with reference to FIGS. 7 to 9. The queue corresponds to, for example, the command queue 223.

In step S22, the command accepting unit 121 determines whether or not a command has been entered.

In the case where no command has been entered, the determination in step S22 results in NO, and the processing proceeds to step S34. In step S34, the CPU 21 of the player terminal 1 determines whether or not a processing termination instruction has been received. Here, although the processing termination instruction is not particularly limited, an instruction for terminating the above certain event (e.g., a battle event) is adopted in this embodiment. That is, when the certain event is terminated, the determination in step S34 results in YES, and the processing at the player terminal 1 side is terminated. On the other hand, in the case where the certain event is being continued, the determination in step S34 results in NO, and the processing returns to step S21, and the subsequent processing is repeated.

When a certain command selecting button is tapped and the corresponding command is accepted by the command accepting unit 121, the determination in step S22 results in YES, and the processing proceeds to step S23. In step S23, the wait-time setting unit 122 determines whether or not a wait-time notification has been received from the server 2. In the case where a wait-time notification has not been received from the server 2 (including the case where the wait time is set to be 0 in step S3 in FIG. 10), the determination in step S23 results in NO, and the processing proceeds to step S24. In step S24, the wait-time setting unit 122 sets a dictated wait time. Here, the dictated wait time refers to a time parameter indicating a "reference speed" for the speed of time flow at the player terminal 1 side. When the processing in step S24 ends, the processing proceeds to step S26. On the other hand, in the case where a wait-time notification has been received (in the case where information representing a wait time is attached to the response received in step S32 in the immediately preceding iteration), the determination in step S23 results in YES, and the processing proceeds to step S25. In step S25, the wait-time setting unit 122 sets the wait time from the server 2. Here, as described earlier, the wait time from the server 2 refers to a time parameter for changing the speed of time flow at the player terminal 1 side relative to the reference speed, which is set by the server 2. When the processing in step S25 ends, the processing proceeds to step S26.

In step S26, the display control unit 124 calculates the speed of movement of command icons (the speed of time flow at the player terminal 1 side) by using the wait time set in step S24 or S25. Specifically, for example, in the case where a frame drawing method, which is adopted in many game systems, is adopted as the method of drawing command icons, the display control unit 124 calculates the number of pixels corresponding to movement per frame as the movement speed. More specifically, for example, let it be supposed that a notification including information representing a wait time of "1000 ms" has been received from the server 2 in a game system in which the screen is updated every 50 ms. In this case, the display control unit 124 calculates the movement speed such that a command icon moves from the first position at the tail of the command queue 223 to the second position at which a request is sent in one second in the example given earlier. That is, the display control unit 124 calculates a value obtained by dividing the number of pixels from a command icon placed at the first position to the second position by (1000/50) as the number of pixels corresponding to movement per frame (movement speed).

In step S27, the display control unit 124 starts the display of movement of a command icon. Specifically, in the example given earlier, the command icon is placed at the first position at the tail of the command queue 223 and begins to move leftward.

In step S28, the command accepting unit 121 determines whether or not an operation has been performed on a command icon. In the case where a drag operation or the like has been performed on a command icon, the determination in step S28 results in YES, and the processing proceeds to step S29. In step S29, the display control unit 124 executes editing processing for deleting a command, changing the order, etc. Then, the processing proceeds to step S30. On the other hand, in the case where a drag operation or the like has not been performed on a command icon, the determination in step S28 results in NO, and the processing proceeds to step S30 without executing command editing processing (the processing in step S29).

In step S30, the display control unit 124 determines whether or not the wait time has elapsed. In the case where the wait time has not elapsed, since the timing for sending a request has not yet arrived, the processing returns to step S28, and the subsequent processing is repeated. That is, before a request is sent, it is possible to execute command editing processing by performing operation on command icons.

After the elapse of the wait time, the determination in step S30 results in YES, and the processing proceeds to step S31. In step S31, the request sending control unit 123 sends the command as a request to the server 2. Thus, if the determination in step S4 results in YES, unless the request is illegitimate, a response and a wait time are sent to the player terminal 1 in step S8. In step S32, the response receiving control unit 125 receives the response and the wait time. In step S33, the command executing unit 126 executes the command. Then, the processing proceeds to step S34, and the subsequent processing is repeated.

For convenience of explanation, in the flowchart in FIG. 11, the processing in steps S27 to S33 is shown as processing within steps S21 to S34. Actually, however, since asynchronous command input is realized in this embodiment, as described earlier, the processing in steps S27 to S33 is executed each time a plurality of commands are input, concurrently as processing for the individual commands.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, the functional configuration in FIG. 4 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 4. Furthermore, the locations of the functional blocks are not particularly limited to those in FIG. 4 and may be arbitrarily set. For example, the functional blocks of the server 2 may be transferred to the player terminal 1, etc., and conversely, the functional blocks of the terminal 1 may be transferred to the server 2, etc. Furthermore, each functional block may be implemented by hardware alone, by software alone, or by a combination of hardware and software.

In a case where the processing by each functional block is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

In other words, an information processing system according to the present invention may be embodied in various forms configured as follows, including the information processing system according to the above-described embodiment in FIG. 1. Specifically, an information processing system according to this embodiment includes a server (e.g., the server 2 in FIG. 1) and a plurality of terminals (e.g., the player terminals 1-1 to 1-$m$ in FIG. 1) that send certain requests to the server. The server includes: monitoring means (e.g., the load monitoring unit 102 in FIG. 4) that monitors whether or not a predetermined condition regarding processing of requests is satisfied; wait-time calculating means (e.g., the wait-time calculating unit 103 in FIG. 4) that calculates a wait time before a request is sent at a terminal side in a case where the predetermined condition is not satisfied; request executing means (e.g., the request executing unit 104 in FIG. 4) that executes requests in the order of arrival thereof and that generates responses; and first sending control means (e.g., the response sending control unit 105 in FIG. 4) that executes control to send the responses to the terminals that have sent the corresponding requests and to also send to the terminals information representing the wait time in a case where the wait time has been calculated. The terminal includes: command accepting means (e.g., the command accepting unit 121 in FIG. 4) that accepts a certain command; wait-time setting means (e.g., the wait-time setting unit 122 in FIG. 4) that sets a wait time identified from information representing the wait time in a case where the information is transmitted from the server and that sets a predetermined time as a wait time in a case where the information is not transmitted; display control means (e.g., the display control unit 124 in FIG. 4) that controls the speed of time flow at the terminal side in accordance with the set wait time so as to control display of an image that changes at the speed of time flow; and second sending control means (the request sending control unit 123 in FIG. 4) that executes control to send the command as a request to the server after the elapse of the set wait time.

Here, it is possible to set the "predetermined condition", for example, by recognizing in advance the processing capabilities of finite computer resources at the server side and presupposing that requests within the processing capabilities arrive. This makes it possible to distribute the arrival of requests from the individual terminals in the temporal direction before requests exceeding the processing capabilities arrive and the server loads reach a peak. That is, it becomes possible to realize proactive load-balancing processing. That is, when requests exceeding the processing ability of the server infrastructure are coming, wait times are set for the individual terminals, and requests are sequentially transmitted to the server in the order of the elapse of the wait times. This enables the server to process the requests without experiencing critical congestion. Accordingly, as a technology for preventing congestion at a server, a technology that can be suitably applied to an information processing system in which a request and response method is adopted is established.

Furthermore, at the terminal side, since it is presupposed that there is a time lag between when a certain command is accepted and when a request for the command is sent, the asynchronous command input described earlier is realized. Furthermore, the speed of time flow at the terminal side is controlled in accordance with a "wait time" set by the server as a time parameter or a "predetermined time" that serves as a reference, and the speed of time flow is visualized and presented to the user (the player in the case of a game). This prevents the user from getting bored or feeling stress from when a command is entered until the command is executed.

Furthermore, since the information processing system according to the present invention does not particularly require additional server hardware or network equipment for load-balancing, it can be realized at extremely low implementation costs compared with before. Furthermore, since the information processing system according to the present invention can be implemented by using existing application protocols (http, https, Web Socket, etc.), it is possible to use existing load balancers in combination without modifications.

Here, the wait-time calculating means of the server may calculate the wait time on the basis of the number of requests arriving per unit time and the number of requests that can be processed per unit time. Accordingly, an appropriate time based on the number of requests that can be processed per unit time (capacity) and the number of requests arriving per unit time (record) is set as a wait time. This makes it possible to realize the proactive load-balancing processing more efficiently.

Furthermore, the server may further include: management means (e.g., the wait-time DB 111 and the CPU 51 in FIG. 4) that manages the arrival time of an immediately preceding request and the wait time for each of the plurality of terminals; and second monitoring means (e.g., the fraud monitoring unit 106 in FIG. 4) that monitors, at the time of arrival of a request, whether or not the terminal that has sent the request has observed the wait time on the basis of the information managed by the management means. This makes it possible to readily execute various kinds of penalizing processing for an illegitimate terminal (the user, or the player in the case of a game) that does not observe the wait time.

Here, as described earlier, the display control means of the terminal controls the speed of time flow at the terminal side in accordance with the set wait time so as to control display of an image that changes at the speed of time flow. Furthermore, the sending control means executes control to send the command as a request to the server after the elapse of the set wait time.

Here, "the image that changes at the speed of time flow" is not limited to that in the above-described embodiment, and an arbitrary moving image may be adopted. For example, in the case where a game is adopted, an animation in which a character in the game moves may be adopted. In this case, the "wait time" set at the terminal side is a parameter for controlling the speed of time flow at the terminal side and is used in the following two methods. In a first method, the wait time is used as a parameter for controlling the rendering time of a moving image. This makes it possible to realize "an image that changes at the speed of time flow". In a second method, the wait time is used as a parameter for controlling the timing at which the next request is sent from the terminal to the server. This makes it possible to realize control by the sending control means.

As described above, an arbitrary moving image suffices for "the image that changes at the speed of time flow". However, an image showing a process in which a symbol representing a command is moved from a first position to a second position is preferable, as in the above-described embodiment. In this case, the speed of movement of the symbol corresponds to the speed of time flow at the terminal side. That is, the image that changes at the speed of time flow is an image showing a process in which the symbol is moved toward the second position at the movement speed. By viewing this image, it becomes possible for the user (the player in the case of a game) to immediately and clearly recognize the speed of time flow. That is, the user can immediately and clearly recognize the time that will be taken before the command is executed. This further prevents the user from getting bored or feeling stress.

Specifically, the display control means of the terminal may execute, as control for displaying an image showing a process in which a symbol representing a command is moved from a first position to a second position, control for displaying an image showing a process in which: the symbol is placed at the first position when the command is accepted; the speed of movement of the symbol is determined such that the symbol will be moved from the first position to the second position in the set wait time; and the symbol is moved toward the second position at the movement speed, and the sending control means may send the command as a request to the server when the symbol has arrived at the second position.

Here, a request is sent from the terminal to the server when the symbol has arrived at the second position. Even if the proactive load-balancing processing is executed, a certain time lag, although short, occurs between sending a request and receiving a response. That is, a certain time lag occurs until the command is executed (invoked) after the symbol arrives at the second position. Thus, the display control means may control display of an image showing a process in which the symbol is moved from the first position to a third position via the second position, and the terminal may further include command executing means that executes processing corresponding to the command on the basis of the response from the server associated with the command when the symbol has arrived at the third position.

The command accepting means may sequentially accept a plurality of commands, the display control means may display an image showing a process in which a plurality of symbols individually corresponding to the plurality of commands are individually moved from the first position to the second position in the order of acceptance of the commands, and the terminal may further include command-order changing means that accepts an operation for exchanging the order of a symbol before reaching the second position with another symbol as an instruction for changing the order of execution of a command corresponding to the symbol. Furthermore, the terminal may further include: command cancelling means that accepts an operation for deleting a symbol before reaching the second position from the image as an instruction for cancelling a command corresponding to the symbol.

This makes it possible for the user (the player in the case of a game) to readily perform editing operations, such as entering another command after entering a command, to change the order of execution (invocation) of commands or deleting a command. This makes it possible to realize the proactive load-balancing processing, while further preventing the user from feeling stress or getting bored.

EXPLANATION OF REFERENCE NUMERALS 1, 1-1 to 1-*m* Player terminals
2 Server
21 CPU
51 CPU
101 Request receiving control unit
102 Load monitoring unit
103 Wait-time calculating unit
104 Request executing unit
105 Response sending control unit
106 Fraud monitoring unit
111 Wait-time DS
121 Command accepting unit
122 Wait-time setting unit
123 Request sending control unit
124 Display control unit
125 Response receiving control unit
126 Command executing unit

The invention claimed is:

1. An information processing system comprising:
a server and a plurality of terminals that send certain requests to the server, wherein the server comprises a first processor coupled to a first memory, wherein the server is configured to:
  monitor whether or not a predetermined condition regarding processing of requests is satisfied;
  calculate a wait time before a request is sent at a terminal side in a case where the predetermined condition is not satisfied;
  request in the order of arrival thereof and that generates responses; and
  send the responses to the plurality of terminals that have sent the corresponding requests and to also send to the plurality of terminals information representing the wait time in a case where the wait time has been calculated, and
wherein a terminal among the plurality of terminals includes a second processor coupled to a second memory and a display, wherein the terminal is configured to:
  accept a plurality of commands from a user that are displayed in a command queue, wherein a respective command of the plurality of commands corresponds to a symbol that is displayed in the command queue;
  set a wait time identified from information representing the wait time in a case where the information is transmitted from the server and that sets a predetermined time as a wait time in a case where the information is not transmitted, wherein the symbol for the respective command is moved from a first position to a second position in the command queue according to the wait time;
  control the speed of time flow at the terminal side in accordance with the set wait time so as to control display of the symbol that moves within the command queue at the speed of time flow;
  change, in response to a predetermined touch operation by the user, an order of the plurality of commands within the command queue, wherein changing the order of the plurality of commands edits a position of at least one command among the plurality of commands; and
  send a command next in the command queue as a request to the server after the elapse of the set wait time.

2. A server that carries out communications with a plurality of terminals that send certain requests, the server, comprising:
a processor coupled to a memory, wherein the processor is configured to:
  monitor whether or not a predetermined condition regarding processing of requests is satisfied;
  calculate a wait time as a time parameter for controlling a speed of time flow at a terminal side in a case where the predetermined condition is not satisfied;
  execute requests in an order of arrival thereof and generating responses from corresponding requests; and
  execute controls to send the responses to the plurality of terminals generating the corresponding requests, and sending information to the plurality of terminals, wherein the information is the wait time in a case where the wait time has been calculated,
wherein the processor is further configured to receive a plurality of commands from a terminal among the plurality of terminals, the plurality of commands being displayed in a command queue on the terminal,
wherein a respective command of the plurality of commands corresponds to a symbol that is displayed in the command queue,
wherein the symbol for the respective command is moved from a first position to a second position in the command queue according to the wait time,
wherein the processor is further configured to receive a request to change an order of the plurality of the commands within the command queue, wherein the request to change the order is in response to a predetermined touch operation by a user, and
wherein the change edits a position of at least one command among the plurality of commands, and
wherein the speed of time flow controls displaying of the symbol that moves within the command queue.

3. The server according to claim 2, wherein the wait-time is calculated based on the number of requests arriving per unit time and the number of requests that can be processed per unit time.

4. The server according to claim 2, wherein the processor is further configured to:
  manage an arrival time of an immediately preceding request and the wait time for each of the plurality of terminals; and
  monitor, at the time of arrival of the immediately preceding request, whether or not the terminal that has sent the request has observed the wait time based on information managed by the processor.

5. A non-transitory computer readable medium storing a program for causing a computer to execute control processing, the computer carrying out communications with a plurality of terminals that send certain requests, the control processing comprising:
  monitoring whether or not a predetermined condition regarding processing of requests is satisfied;
  calculating a wait time as a time parameter for controlling a speed of time flow at a terminal side in a case where the predetermined condition is not satisfied;
  executing requests in an order of arrival thereof and generating responses from corresponding requests;
  executing control to send the responses to the plurality of terminals that have sent the corresponding requests and to also send to the plurality of terminals information representing the wait time in a case where the wait time has been calculated; and receiving a plurality of commands from a terminal among the plurality of terminals that are displayed in a command queue on the terminal, wherein a respective command of the plurality of commands corresponds to a symbol that is displayed in the command queue, wherein the symbol for the respective command is moved from a first position to a second position in the command queue according to the wait time; and receiving a request to change an order of the plurality of the commands within the command queue, wherein the request to change the order is in response to a predetermined touch operation by a user, and wherein the change edits a position of at least one command among the plurality of commands, and wherein the speed of time flow controls displaying of the symbol that moves within the command queue.

6. A terminal that carries out communications with a server that sends a response to a request to a terminal that has sent the request and that also sends to the terminal information representing a wait time before a next request is sent in a case where a predetermined condition is satisfied, the terminal comprising:

a processor coupled to a memory, and a display for providing a game execution environment, wherein the processor is configured to:

accept a plurality of commands from a user that are displayed in a command queue, wherein a respective command of the plurality of commands corresponds to a symbol that is displayed in the command queue;

set a wait time identified from information representing the wait time in a case where the information is transmitted from the server and that sets a predetermined time as a wait time in a case where the information is not transmitted, wherein the symbol for the respective command is moved from a first position to a second position in the command queue according to the wait time;

control a speed of time flow at a terminal side in accordance with the set wait time so as to control display of the symbol that moves within the command queue at the speed of time flow;

change, in response to a predetermined touch operation by the user, an order of the plurality of commands within the command queue, wherein changing the order of the plurality of commands edits a position of at least one command among the plurality of commands; and send a command next in the command queue as a request to the server after an elapse of the set wait time.

7. The terminal according to claim 6, wherein the symbol is placed at the first position when the command is accepted, wherein the speed of movement of the symbol is determined such that the symbol is moved from the first position to the second position in the set wait time, and wherein the symbol is moved toward the second position at the movement speed, and wherein the processor is configured to send the command as a request to the server when the symbol has arrived at the second position.

8. The terminal according to claim 7, wherein the symbol is moved from the first position to a third position in the display via the second position, and wherein the processor is further configured to execute processing corresponding to the command based on the response from the server associated with the command when the symbol has arrived at the third position.

9. The terminal according to claim 7, wherein the plurality of commands are sequentially accepted, wherein an image in the display showing a process in which a plurality of symbols individually corresponding to the plurality of commands are individually moved from the first position to the second position in the order of acceptance of the commands, and wherein the processor is configured to accept an operation for exchanging the order of the symbol before reaching the second position with another symbol as an instruction for changing the order of execution of a command corresponding to the symbol.

10. The terminal according to claim 7, wherein the processor is further configured to accept an operation for deleting the symbol before reaching the second position from the image, in the display, as an instruction for cancelling a command corresponding to the symbol.

11. A non-transitory computer readable medium storing a program for causing a computer to execute control processing, the computer functions as a terminal having a display for providing a game execution environment through communication with a server, the server sends a response to a request to the terminal that has sent the request and that also sends to the terminal information representing a wait time before a next request is sent in a case where a predetermined condition is satisfied, the control processing comprising:

accepting a plurality of commands from a user that are displayed in a command queue, wherein a respective command of the plurality of commands corresponds to a symbol that is displayed in the command queue;

setting a wait time identified from information representing the wait time in a case where the information is transmitted from the server and setting a predetermined time as a wait time in a case where the information is not transmitted, wherein the symbol for the respective command is moved from a first position to a second position in the command queue according to the wait time;

controlling the speed of time flow at the terminal side in accordance with the set wait time so as to control display of the symbol that moves within the command queue at the speed of time flow;

changing, in response to a predetermined touch operation by the user, an order of the plurality of commands within the command queue, wherein changing the order of the plurality of commands edits a position of at least one command among the plurality of commands; and sending a command next in the command queue as a request to the server after the elapse of the set wait time.

12. The information processing system according to claim 1, wherein the terminal is configured to execute a game and the plurality of the commands are visualized in the game, and wherein the server is configured to execute accepted plurality of the commands and the responses correspond to the game.

13. The information processing system according to claim 1, wherein the predetermined condition corresponds to a number of requests, arriving at the server within a unit time, not exceeding a predetermined threshold, wherein the predetermined threshold is a range that does not exceed a maximum number of requests processed within the unit time on the server.

14. The information processing system according to claim 1, wherein the wait time is a predetermined time until the terminal transmits a next request when the predetermined threshold is exceeded.

\* \* \* \* \*